(12) United States Patent
Penner et al.

(10) Patent No.: US 9,797,472 B2
(45) Date of Patent: Oct. 24, 2017

(54) PLATE-LINK CHAIN

(71) Applicant: SCHAEFFLER TECHNOLOGIES AG & CO. KG, Herzogenaurach (DE)

(72) Inventors: Stephan Penner, Bühl (DE); Jürgen Ochs, Bühl (DE); Anna Ruf, Offenburg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 56 days.

(21) Appl. No.: 14/647,048

(22) PCT Filed: Nov. 11, 2013

(86) PCT No.: PCT/DE2013/200294
§ 371 (c)(1),
(2) Date: May 22, 2015

(87) PCT Pub. No.: WO2014/082636
PCT Pub. Date: Jun. 5, 2014

(65) Prior Publication Data
US 2015/0285338 A1    Oct. 8, 2015

(30) Foreign Application Priority Data

Nov. 30, 2012 (DE) .................. 10 2012 222 007

(51) Int. Cl.
*F16G 13/08* (2006.01)
*F16G 5/18* (2006.01)

(52) U.S. Cl.
CPC ............... *F16G 13/08* (2013.01); *F16G 5/18* (2013.01)

(58) Field of Classification Search
CPC ............... F16G 5/18; F16G 13/08; F16H 9/24
See application file for complete search history.

(56) References Cited

U.S. PATENT DOCUMENTS

| 1,727,129 A | 9/1929 | Morse |
| 4,642,079 A | 2/1987 | Horowitz et al. |
| (Continued) | | |

FOREIGN PATENT DOCUMENTS

| CN | 101198808 A | 6/2008 |
| CN | 101903682 A | 12/2010 |
| (Continued) | | |

OTHER PUBLICATIONS

Chinese Office Action dated Dec. 29, 2015, in Chinese application corresponding with PCT/DE2013/200294.
(Continued)

*Primary Examiner* — Minh Truong
(74) *Attorney, Agent, or Firm* — Alfred J. Mangels

(57) ABSTRACT

A plate-link chain for a continuously variable transmission of a motor vehicle. The chain includes relatively long and relatively short chain links. In long-short regions the chain links are arranged to overlap in a chain running direction by arranging plate-links disposed adjacent to one another transversely with respect to the chain running direction, and coupled to one another by pairs of rocker pressure members. In the long-short regions the plate-links of the chain links are arranged in a double configuration or in a triple configuration. Spacing or biasing elements are provided between pairs of side-by-side plate-links to provide damping of the plate-link chain when in operation.

7 Claims, 2 Drawing Sheets

(56) References Cited

U.S. PATENT DOCUMENTS

| | | | |
|---|---|---|---|
| 5,427,583 A | 6/1995 | Wolf | |
| 5,700,217 A * | 12/1997 | Wakabayashi | F16G 13/04 474/214 |
| 6,478,704 B1 | 11/2002 | Greiter | |
| 6,558,281 B1 | 5/2003 | Greiter | |
| 7,682,273 B2 * | 3/2010 | Mott | F16G 13/04 474/212 |
| 7,686,722 B2 * | 3/2010 | Baumann | F16G 5/18 474/215 |
| 7,850,565 B2 | 12/2010 | Junig et al. | |
| 8,016,706 B2 | 9/2011 | Junig et al. | |
| 8,192,313 B2 | 6/2012 | Ispolatova et al. | |
| 2005/0119081 A1 | 6/2005 | Triller et al. | |
| 2007/0197331 A1 * | 8/2007 | Junig | F16G 13/04 474/215 |
| 2007/0197332 A1 | 8/2007 | Junig et al. | |
| 2008/0176693 A1 * | 7/2008 | Teubert | F16G 5/18 474/229 |
| 2009/0181817 A1 * | 7/2009 | Huttinger | B21L 11/00 474/229 |
| 2009/0233745 A1 | 9/2009 | Tada et al. | |
| 2010/0069188 A1 * | 3/2010 | Adachi | B62D 55/096 474/213 |

FOREIGN PATENT DOCUMENTS

| | | |
|---|---|---|
| DE | 44 29 223 C1 | 8/1995 |
| DE | 199 51 949 A1 | 5/2000 |
| DE | 100 36 258 A1 | 3/2001 |
| DE | 100 47 979 A1 | 4/2001 |
| EP | 0 643 240 A1 | 3/1995 |
| EP | 1 947 368 A1 | 7/2008 |
| WO | WO 03/052290 A1 | 6/2003 |
| WO | WO 2007/076761 A1 | 7/2007 |
| WO | WO 2008/071145 A1 | 6/2008 |

OTHER PUBLICATIONS

International Search Report, dated Mar. 31, 2014, issued by ISA/EPO in Application No. PCT/DE2013/200294.

Translation of the Written Opinion of the International Searching Authority, dated May 31, 2015, issued in Application No. PCT/DE2013/200294.

* cited by examiner

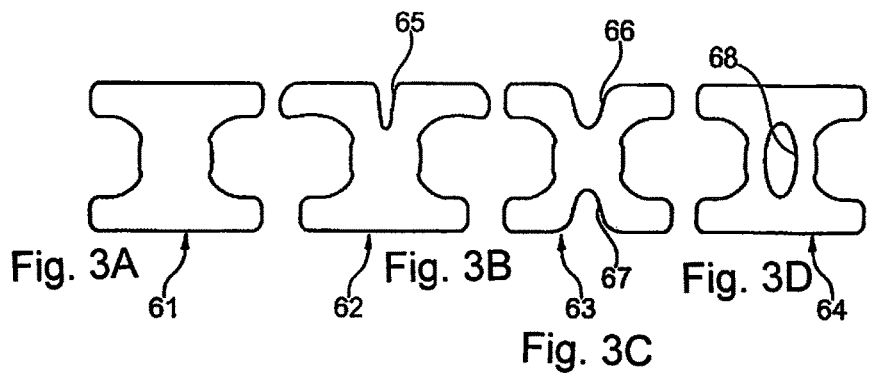
Fig. 3A 61  Fig. 3B 62  Fig. 3C 63  Fig. 3D 64
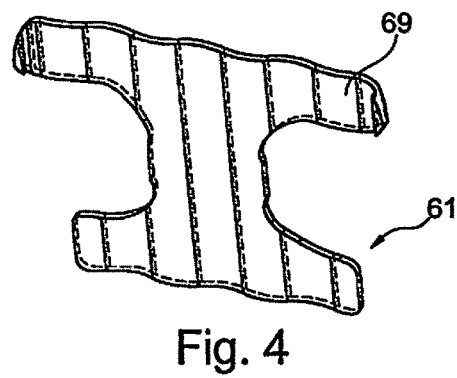
Fig. 4
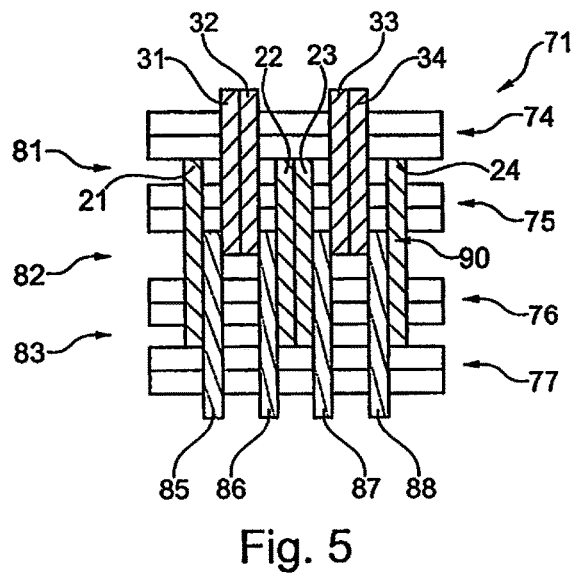
Fig. 5

PLATE-LINK CHAIN

CROSS-REFERENCE TO RELATED APPLICATION

This application is the U.S. national phase application under 35 U.S.C. §371 of International Application Serial No. PCT/DE2013/200294, having an international filing date of 11 Nov. 2013, and designating the United States, which claims priority based upon German Patent Application No. DE 10 2012 222 007.0, filed on 30 Nov. 2012, the entire contents of each of which applications are hereby incorporated by reference herein to the same extent as if fully rewritten.

BACKGROUND OF THE INVENTION

Field of the Invention

The present invention relates to a plate-link chain, in particular for a continuously variable transmission of a motor vehicle. The chain includes relatively long and relatively short chain links, which are arranged in long-short regions to overlap in a chain running direction. The relatively long and relatively short plate-links are disposed adjacent to one another, transversely with respect to the chain running direction, and are coupled to one another by pairs of rocker pressure members.

Description of the Related Art

From the German published application DE 100 36 258 A1 a plate-link chain for a continuously variable transmission of a motor vehicle is known, which is made up of individual chain links that are connected to one another by articulation devices. Each of the chain links has a plurality of plate-links disposed essentially parallel to each other, at least part of the chain links having different plate-links with at least one first type of plate-link and at least one second type of plate-link. From the German published application DE 199 51 949 A1 a plate-link chain is known having a plurality of link plates which are hingedly connected with one another by means of pressure members, the pressure members running transversely to the longitudinal direction of the chain. A deflection of the plate-link chain in at least one direction transverse to its running direction to damp pressure vibrations is subject to resistance.

An object of the present invention is to optimize a plate-link chain, in particular with regard to undesired swing-back during operation.

SUMMARY OF THE INVENTION

The object is achieved by a plate-link chain, in particular for a continuously variable transmission of a motor vehicle, that includes relatively long and relatively short chain links. In long-short regions the chain links are arranged to overlap in a chain running direction and include relatively long and relatively short plate-links disposed adjacent to one another transversely with respect to the chain running direction, and coupled to one another by pairs of rocker pressure members. The plate-links of the chain links are arranged in a double configuration in the long-short regions, and otherwise in a triple configuration. The double configuration is also known as a two-plate grouping. Similarly, the triple configuration is known as a three-plate grouping. The longer and the shorter chain links have various pitches in order to enable so-called randomization. The pitch of the larger chain links is large enough so that two plate-link sets of the shorter chain links fit between the rocker joints. According to an essential aspect of the invention, the longer chain links deviate from the triple pattern. Instead, the plate-link pattern is mirrored in the respective longer chain link; that is, the following chain link has the same plate-link arrangement as the preceding one. As a result, the plate-links lie in the same position and contact one another at the corresponding outside contour.

One preferred exemplary embodiment is characterized in that in the long-short regions, the plate links of preceding and following chain links in the chain running direction are arranged in a line so that the plate-links contact one another with their ends that face one another. The terms preceding and following refer to the introduction of power or torque in the operation of the chain. The pairs of rocker pressure members each include two rocker members which, together with the plate-links, constitute rocker joints. The longer and shorter chain links include different types of plate-links. According to one aspect of the invention, the long-short region can be represented with just two types of plate-links. This provides, in particular, the advantage that overlap tips, which would otherwise be necessary, can be dispensed with.

Another preferred exemplary embodiment of the plate-link chain is characterized in that outside contours of the mutually abutting ends of the chain links are shaped so that a deflection of the plate-link chain in a straight strand transverse to the running direction of the chain, in particular in an upper region, is prevented. The outside contours of the mutually abutting ends of the chain links, in particular of mutually abutting plate-link sets of the shorter plate-links, are preferably shaped in the upper region so that those plate-links are in contact with one another in the straight strand and prevent swing-back.

Another preferred exemplary embodiment of the plate-link chain is characterized in that transverse to the chain running direction intermediate spaces are left free between plate-links of the longer and plate-links of the shorter chain links. Transverse means crosswise to the chain running direction. The intermediate spaces are filled with the following functional options, which can be combined with one another in any manner desired. According to one variant, the intermediate spaces can be filled with defined masses, in order to ensure homogeneous weight distribution by equalizing the weight. According to another variant, to damp the joints the intermediate spaces can be filled with elastic elements which are beneficially biased before being placed around the rocker joints. According to another variant, the plate-links can be biased against one another by filling the intermediate spaces transversely to the chain running directions. This improves the damping of the plate-link chain. According to another variant, the plate-links can be biased in the chain running direction against neighboring rocker pressure pieces in order to improve the elasticity or damping of the plate-link chain. According to still another variant, the plate-links can be biased in the chain running direction against one another, which improves the elasticity or damping of the chain.

The intermediate spaces can be completely or partially filled to constitute the previously described variants. For the stated purposes, the intermediate spaces can be completely or partially filled with intermediate elements made of an elastomeric material, such as rubber or a rubber-coated fabric. Alternatively, or additionally, the intermediate spaces can be completely or partially filled with sheet metal material, in particular corrugated, and/or with shaped wire spring material. The material which completely or partially fills the intermediate spaces can be integrally connected to the plate-links as a single piece.

Another preferred exemplary embodiment of the plate-link chain is characterized in that spacing and/or biasing elements are disposed in the intermediate spaces. The spacing and/or biasing elements are preferably operative in the chain running direction and/or transversely, i.e., crosswise to the chain running direction.

Another preferred exemplary embodiment of the plate-link chain is characterized in that the spacing and/or biasing elements are supported in the intermediate spaces in the chain running direction and/or crosswise to the chain running direction. The support beneficially enables unwanted vibrations in the operation of the plate-link chain to be prevented, or at least significantly reduced.

Another preferred exemplary embodiment of the plate-link chain is characterized in that the spacing and/or biasing elements are made from a corrugated spring material. The corrugated spring material enables biasing transverse to the chain running direction to be effective in a simple manner. The corrugated spring material can also enable biasing to be effective in the chain running direction.

Another preferred exemplary embodiment of the plate-link chain is characterized in that the spacing and/or biasing elements are made from a corrugated spring material. Depending on the design, the spacing and/or biasing elements can be provided with indentations and/or cutouts.

Another preferred exemplary embodiment of the plate-link chain is characterized in that the longer chain links each include two inner and two outer plate-links. The terms inner and outer refer to the transverse direction, i.e., crosswise to the chain running direction. In the middle, two longer plate-links of the longer chain links are disposed side-by-side or parallel, crosswise to the chain running direction. On the outside in each case, a longer plate-link of the longer chain links is spaced from the inner plate-links, crosswise to the chain running direction.

Another preferred exemplary embodiment of the plate-link chain is characterized in that crosswise to the chain running direction, between the inner and the outer plate-links of the longer chain links; in each case four identical plate-links of the shorter chain links are disposed. The four identical plate-links of the identical chain links are combined in each case into two pairs of plate-links.

The invention also relates to a spacing and/or biasing element for a previously described plate-link chain. The spacing and/or biasing element can be marketed separately.

The invention also relates to a chain-driven conical-pulley transmission having a previously described plate-link chain. The chain-driven conical-pulley transmission is also referred to as a CVT or continuously-variable transmission.

The plate-link chain according to the invention is a plate-link chain for a continuously variable transmission of a motor vehicle, the chain having a plurality of chain links. A plate-link chain of that type is described in the German published application DE 100 47 979 A1. The construction and function of a chain-driven conical-pulley transmission are suggested in that same published unexamined application.

BRIEF DESCRIPTION OF THE DRAWINGS

Additional advantages, features, and details of the invention can be seen from the following description, in which various exemplary embodiments are described in detail with reference to the drawings. The figures show the following:

FIGS. 3A, 3B, 3C, and 3D show various embodiments of spacing and/or biasing elements in a side view;

FIG. 4 shows a perspective view of one of the spacing and/or biasing elements shown in FIG. 3; and FIG. 5 shows a top view of a portion of a plate-link chain in triple configuration.

DESCRIPTION OF THE PREFERRED EMBODIMENTS

Figure 1:
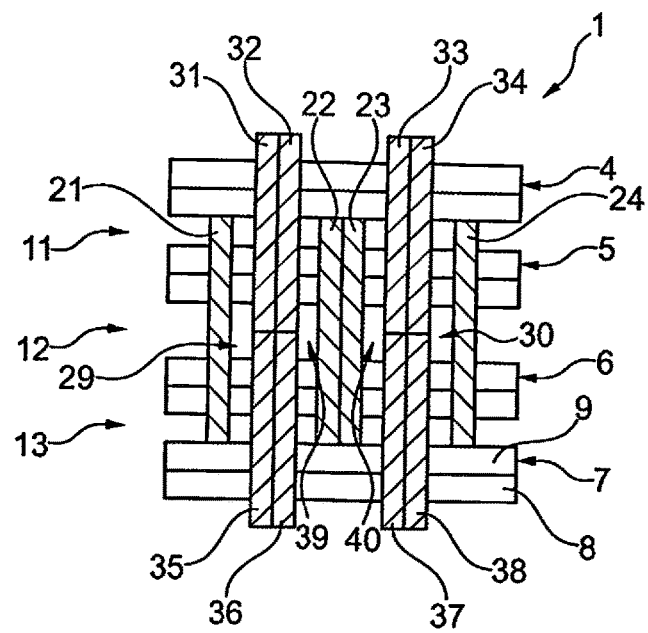
FIG. 1 shows a top view of a portion of a plate-link chain in double configuration.

FIG. 1 shows a plate-link chain portion 1 in double configuration in simplified form. The plate-link portion 1 includes four rocker pressure member pairs 4, 5, 6, and 7. Each rocker pressure member pair 4 through 7 includes two rocker pressure members 8, 9. Two of the rocker pressure member pairs 4 through 7 serve to constitute a chain link 11, 12, 13.

In the double configuration shown in FIG. 1, the chain links 11 and 13 are designed as shorter or short chain links. Chain link 12 is designed as a longer or long chain link. The longer chain link 12 includes four plate-links 21 through 24, which are coupled with one another by the rocker pressure member pairs 5 and 6. The plate-links 21 through 24 of the long chain link 12 are of identical design.

The short chain link 11 includes four plate-links 31 through 34, which are coupled with one another by the rocker pressure member pairs 4 and 5. The short chain link 13 includes four plate-links 35 through 38, which are coupled with one another by the rocker pressure member pairs 6 and 7. The plate-links 31 through 38 of the short chain links 11 and 13 are of identical design.

A chain running direction extends in the vertical direction in FIG. 1. In the plate-link chain portion 1, the two plate-links 22, 23 of the long chain link 12 are disposed medially. The plate-links 31, 32, 33, 34, 35, 36, 37, 38 of the short chain links 11 and 13 are combined in pairs. The plate-link pairs 31, 32 and 35, 36 of the short chain links 11 and 13 contact one another at their longitudinal ends that face one another.

The plate-link pairs 31, 32 and 35, 36 are disposed laterally relative to the chain running direction between the plate-links 21 and 22 of the long chain link 12. The plate-link pairs 33, 34 and 37, 38 of the short chain links 11 and 13 are similarly disposed laterally relative to the chain running direction between the plate-links 23 and 24 of the long chain link 12. The longitudinal ends of the plate-link pairs 33, 34 and 37, 38 that face one another contact one another.

Intermediate spaces 29, 30 are produced between the outer plate-links 21, 24 of the long chain link 12 and the plate-links 31, 35, 34, 38 of the shorter chain links 11 and 13 in the arrangement shown in FIG. 1. Furthermore, the double configuration in FIG. 1 includes intermediate spaces 39, 40 between the longer plate-links 22, 23 of the long chain link 12 and the shorter plate-links 32, 36, 33, 37 of the shorter chain links 11 and 13.

The intermediate spaces 29, 30 and/or 39, 40 are advantageously provided with spacing and/or biasing elements (not shown in FIG. 1). Filling the intermediate spaces 29, 30, 39, 40 fulfills at least one of the following functional options.

1. weight balancing for a uniform distribution of weight in the plate-link chain;

2. joint damping by means of elastic elements which lie pre-stressed around the rocker joints;

3. damping through axial bracing of the plate-links against one another;

4. springing/damping of the plate-links against the respective neighbor rocker pressure piece in the chain running direction;

5. springing/damping of the plate-links against following plate-links in the chain running direction.

Figure 2A:
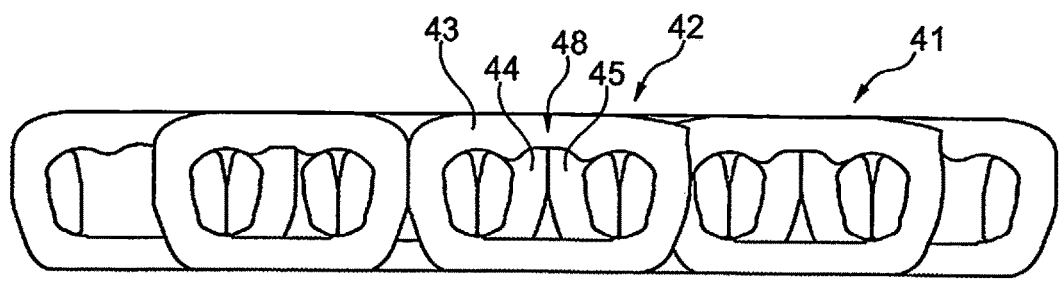
FIG. 2A shows a portion of a plate-link chain in a side view in double/triple configuration.

FIG. 2A shows a side view of a portion of a plate-link chain 41 having a long chain link 42. Within a longer plate-link 43 of the long chain-link 42 there are visible two longitudinal ends or bows 44, 45 of plate-links of a longer and a shorter chain link. To the left thereof the same is shown, but in the foreground.

The mutually facing longitudinal ends or bows 44, 45 of the plate-links of the two chain links contact one another. The ends 44, 45 are shaped on top so that the plate-links to which they belong are in contact when the chain is in a straight strand, as shown in FIG. 2A. By straight contacting surfaces at the ends 44, 45 or bows in a contact region 48, unwanted swing-back of the plate-link chain 41 is prevented when it is in the straight strand orientation.

Figure 2B:
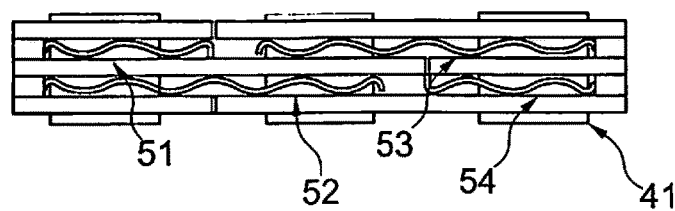
FIG. 2B shows a portion of a plate-link chain in a top view in double/triple configuration.

In the intermediate spaces 29, 30 shown in FIG. 1, and laterally relative to the chain running direction, between individual plate-links of the longer and shorter chain links spacing and/or biasing elements 51 through 54 are positioned as shown in FIG. 2B. The spacing and/or biasing elements 51 through 54 on the one hand prevent unwanted telescoping of the longer chain links. In addition, so-called guide tips, which are also referred to as overlap tips and will be explained below in reference to FIG. 5, can be eliminated.

FIGS. 3A through 3D show different forms of spacing and/or biasing elements 61 through 64 in side views. The spacing and/or biasing elements 61, 62, and 64 are essentially H-shaped. The spacing and/or biasing element 63 is essentially X-shaped.

The spacing and/or biasing element 62 has a notch 65 on top. The spacing and/or biasing element 63 has notches 66, 67 on top and bottom. The spacing and/or biasing element 64 has a central opening 68.

FIG. 4 shows a spacing and/or biasing element 61 of FIG. 3A in a perspective view. In that view it can be seen that the spacing and/or biasing element 61 is made of a corrugated material having corrugations 69 that extend between opposed longitudinal outer edges of the biasing element 61. The material from which biasing element 61 is made can be a spring material.

FIG. 5 shows a plate-link chain portion 71 in triple configuration, also referred to as a triple grouping. The illustrated plate-link chain portion 71 includes four rocker pressure member pairs 74 through 77, which serve to connect three chain links 81 through 83. The chain links 81 and 83 are designed as shorter chain links. Chain link 82 is designed as a longer chain link.

The shorter chain link 81 includes four plate-links 31 through 34, which are designed and identified exactly like the plate-links of the shorter chain link 11 in FIG. 1. The longer chain link 82 includes four plate-links 21 through 24, which are configured and arranged exactly like the plate-links of the longer chain link 12 in FIG. 1.

The shorter chain link 83 includes four plate-links 85, 86, 87, and 88, which are distributed differently than the other plate-links in the plate-link chain portion 71. At the longitudinal ends of the plate-links 85 through 88 as shown in FIG. 5, in an overlap region 90, there result overlap ends, which are also referred to as guide ends.

In a manner similar to the previously described spacing and/or biasing elements, the overlap ends prevent unwanted sliding between one another of laterally spaced plate-links of the chain links 81 through 83. However, the overlap ends or guide ends do not perform a biasing function, as do the spacing and/or biasing elements 61.

What is claimed is:

1. A plate-link chain for a continuously variable transmission of a motor vehicle, said chain comprising: first chain links having a first chain link length extending in a chain running direction and second chain links having a second chain link length extending in the chain running direction, wherein the first chain link length is larger than the second chain link length, which first and second chain link lengths in regions of the chain define respective long and short chain link portions, wherein the first and second chain links are arranged to overlap each other in the chain running direction and include respective long and short plate-links disposed adjacent to one another transversely with respect to the chain running direction and coupled to one another by pairs of rocker pressure members, wherein the respective first and second chain links are arranged in a double configuration defined by at least a pair of contacting plate-links in, and wherein in the first and second chain link length regions of the chain the plate-links of preceding and following short chain link pairs contact one another at respective longitudinal outer contours at plate-link contacting ends that face one another in the chain running direction.

2. The plate-link chain according to claim 1, wherein the outer contours of the contacting ends of the short chain links are shaped so that a deflection of the plate-link chain transverse to the running direction of the chain when the chain is in a straight strand is minimized.

3. The plate-link chain according to claim 1, wherein intermediate spaces are provided between the first chain links and the second chain links in a direction transverse to the chain running direction.

4. The plate-link chain according to claim 1, wherein the first chain links each include two inner and two outer plate-links.

5. The plate-link chain according to claim 4, wherein transverse to the chain running direction and between the inner and the outer plate-links of the first chain links four identical plate-links of the second chain links are disposed.

6. The plate-link chain according to claim 1, wherein the pair of first plate-links are in side-by-side contacting relationship.

7. The plate-link chain according to claim 1, wherein pairs of the first chain links are spaced between and laterally from adjacent pairs of the second chain links to define intermediate spaces.

* * * * *